(12) United States Patent
Umstead et al.

(10) Patent No.: US 6,363,614 B1
(45) Date of Patent: Apr. 2, 2002

(54) COMBINATION UTILITY RETRACTABLE SAW AND KNIFE DEVICE

(76) Inventors: George H. Umstead, 803 Park Blvd., Altoona, PA (US) 16601; Steven M. Umstead, RD 2 Box 610B, Tyrone, PA (US) 16686

( * ) Notice: Subject to any disclaimer, the term of this patent is extended or adjusted under 35 U.S.C. 154(b) by 0 days.

(21) Appl. No.: 09/416,345

(22) Filed: Oct. 12, 1999

(51) Int. Cl.[7] .................................................. B25F 1/04
(52) U.S. Cl. .......................................... 30/144; 30/162
(58) Field of Search ........................ 30/501, 502, 335, 30/517, 162, 144; 83/854, 835

(56) References Cited

U.S. PATENT DOCUMENTS

| | | | |
|---|---|---|---|
| 350,403 A | * 10/1886 | Ostrand | 30/502 |
| 5,584,123 A | * 12/1996 | Chi | 30/335 X |
| 5,794,345 A | * 8/1998 | Ryon et al. | 30/517 X |

* cited by examiner

Primary Examiner—Douglas D. Watts
(74) Attorney, Agent, or Firm—James Ray & Associates (57) ABSTRACT

The present invention provides a combination utility retractable saw and knife device that comprises a handle member having a predetermined configuration and a knife blade disposed within a cavity formed in the handle member when in a retracted position. The knife blade member has a predetermined configuration. It further includes a saw blade disposed within a radially opposed cavity of such handle member when in a retracted position. Such combination device further includes a means engageable with the saw blade for connecting it with the handle and a means engageable with the knife blade for connecting it with the handle. There is also a means engageable with the saw blade for at least one of slidably moving and pivotably rotating the saw blade to an operable position, the means being at least partially disposed within the handle and a means engageable with the knife blade for slidably moving the knife blade member to an operable position, such means also being at least partially disposed within the handle. There is further a means engageable with the saw blade and the handle for locking the saw blade in an operable position and in a retracted position, such means being at least partially disposed within the handle and a means engageable with the knife blade and the handle for locking the knife blade in an operable and a retracted position, such means being at least partially disposed within said handle member.

15 Claims, 6 Drawing Sheets

COMBINATION UTILITY RETRACTABLE SAW AND KNIFE DEVICE

FIELD OF THE INVENTION

The present invention relates, in general, to a tool for cutting and, more particularly, the present invention relates to a retractable saw and knife combination tool that can be used for cutting metal, wood, drywall, plaster and plastic.

BACKGROUND OF THE INVENTION

There are a wide variety of tools that provide blades in which the blade is either folding or retractable. Some of these tools furnish a saw blade which is enclosed into a handle when not in use and extends out of the handle in a manner similar to a pocket knife when the tool is to be used as a saw. In most of these tools the saw blade extends out of the tool and locks in position so that the handle and saw blade are in a straight line. Some tools provide that the blade can be locked in several different positions.

Other tools that are commercially available provide blades that retract within a handle such as is found in many utility knives. In these tools the blade retracts into a hollow portion of the handle when not in use and extends out of handle and locks in place when it is to be used as a knife. All of these tools are very handy for the worker. However, a worker who has need of a saw and a knife must carry two separate tools in his tool pouch. Carrying both of these tools along with assorted screwdrivers, hammers and other tools requires considerable room in a tool pouch and room in the tool pouch is limited.

Thus, there is a need for a compact, durable pocket device which can provide a worker with a tool which includes both a saw blade and a knife blade which will enable such worker to saw or cut with the same tool.

SUMMARY OF THE INVENTION

A first aspect of the invention provides a multipurpose blade member for use in a utility tool, such blade member comprising an elongated metallic strip portion having a predetermined thickness and a predetermined composition and having a first end having a first predetermined width and a second end having a second predetermined width. Such elongated strip portion further has a first elongated edge disposed between such first end and such second end having a first serrated surface and a second elongated edge disposed between such first end and such second end having a second serrated surface, such second elongated edge being radially opposed to the first elongated edge. There is further a means disposed closely adjacent one end of the elongated metallic strip and engageable with the multipurpose blade member and a handle portion of such utility tool for securing the multipurpose blade member to such handle portion of such utility tool.

A second aspect of the invention provides a retractable saw device comprising a handle member having a predetermined configuration and a saw blade member formed from an elongated metallic strip. Such saw blade member is disposed within a cavity formed in the handle member when in a retracted position, and the elongated strip portion of the saw blade member having a predetermined thickness and a predetermined composition, a first end having a first predetermined width and a second end having a second predetermined width. There is a first elongated edge disposed between the first end and the second end, and a second elongated edge disposed between the first end and the second end, at least one of the first elongated edge and second elongated edge having a serrated surface. There is also a means engageable with the saw blade member for connecting the saw blade member with the handle member of the retractable saw device. The retractable saw device further includes a means engageable with the saw blade member for at least one of slidably moving and pivotably rotating the saw blade member to an operable position, the means for at least one of slidably moving and pivotably rotating the saw blade member being at least partially disposed within such handle member and a means engageable with the saw blade member and handle member for locking the saw blade member in an operable position and in the retracted position, such means for locking the saw blade member being at least partially disposed within the handle member.

A third aspect of the invention provides a combination utility retractable saw and knife device that comprises a handle member having a predetermined configuration and a knife blade member disposed within a cavity formed in the handle member when in a retracted position. The knife blade member has a predetermined configuration. There is further a saw blade member formed from an elongated metallic strip. The elongated metallic strip has a predetermined thickness and a predetermined composition, a first end having a first predetermined width, a second end having a second predetermined width. The metallic strip further has a first elongated edge disposed between the first and second ends and a second elongated edge also disposed between the first and second ends with at least one of the first and second elongated edges having a serrated surface. The elongated metallic strip is disposed in one of within a radially opposed cavity formed in a portion of such handle member and attached to an exterior portion of such handle member when in a retracted position, such exterior portion having an enclosure at least enclosing the saw blade member such that edges of the saw blade are not exposed when in a retracted position. Such combination device further includes a means engageable with the saw blade member for connecting it with the handle member and a means engageable with the knife blade member for connecting it with the handle member. There is a means engageable with the knife blade for slidably moving the knife blade member to an operable position, such means being at least partially disposed within the handle member and a means engageable with the saw blade member for at least one of slidably moving and pivotably rotating the saw blade to an operable position, such means being at least partially disposed in one of within the handle member and attached to an exterior portion of the handle member. There is further a means engageable with the knife blade member and the handle member for locking the knife blade in an operable and a retracted position, such means being at least partially disposed within such handle member and a means engageable with the saw blade member and the handle member for locking the saw blade member in an operable position and in a retracted position, such means being at least partially disposed within such handle member or attached to such exterior portion of such handle member.

In a fourth aspect of the invention there is provided a tool that in combination with a utility knife having a handle member and a knife blade, the improvement comprises an apparatus for engaging a saw device to the handle member. The apparatus includes a housing member having a predetermined configuration and a saw blade member formed from an elongated metallic strip, such saw blade member is disposed within a cavity formed in the housing member when in a retracted position. The elongated strip portion has a predetermined thickness and a predetermined composition, a first end having a first predetermined width, a second end having a second predetermined width. There is further a first elongated edge disposed between the first end and the second end, and a second elongated edge also disposed between the first end and the second end, with at least one of the first elongated edge and the second elongated edge having a serrated surface. There is further a means engageable with the saw blade member for connecting it with the housing member, a means engageable with the saw blade member for at least one of slidably moving and pivotably rotating the saw blade member to an operable position, such means being at least partially disposed in the housing member, a means engageable with the saw blade member and housing member for locking the saw blade member in an operable position and in a retracted position, such means for locking the saw blade member being at least partially disposed in the housing member, and a means disposed on the housing member for securing such apparatus to the utility knife.

OBJECTS OF THE INVENTION

It is, therefore, one of the primary objects of the present invention to provide a combination tool which contains both a saw blade and a knife blade.

An additional object of the present invention is to provide a tool in which the blades are easily replaceable.

It is also an object of the present invention to provide a tool in which the saw blade is capable of sawing either metal or nonmetallic surfaces.

Yet another object of the present invention is to provide a tool in which the saw blade can be disposed to saw at a 90 degree angle from the handle.

Still another object of the present invention is to provide a saw blade with different serrations on opposing sides of the saw blade.

It is yet an additional object of the invention to provide a tool which can combine with a utility knife to provide a saw blade to such utility tool.

In addition to the various objects and advantages of the present invention which have been described in some specific detail above, various additional objects and advantages of the invention will become much more readily apparent to those persons who are particularly skilled in the relevant art from the following more detailed description of such invention, particularly, when such detailed description is taken in conjunction with the attached drawing Figures and with the appended claims.

BRIEF DESCRIPTION OF THE PRESENTLY PREFERRED AND VARIOUS ALTERNATIVE EMBODIMENTS OF THE INVENTION

Prior to proceeding to the more detailed description of the present invention, it should be noted that for the sake of clarity in understanding the invention, identical components with identical functions have been designated with identical reference numerals throughout the drawing Figures.

Figure 1:
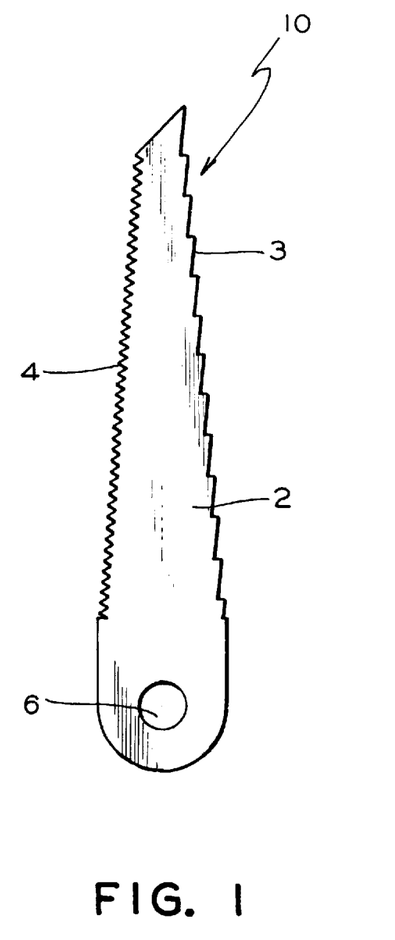
FIG. 1 is a top view of a multipurpose blade member according to a first embodiment of the invention.
Figure 2:
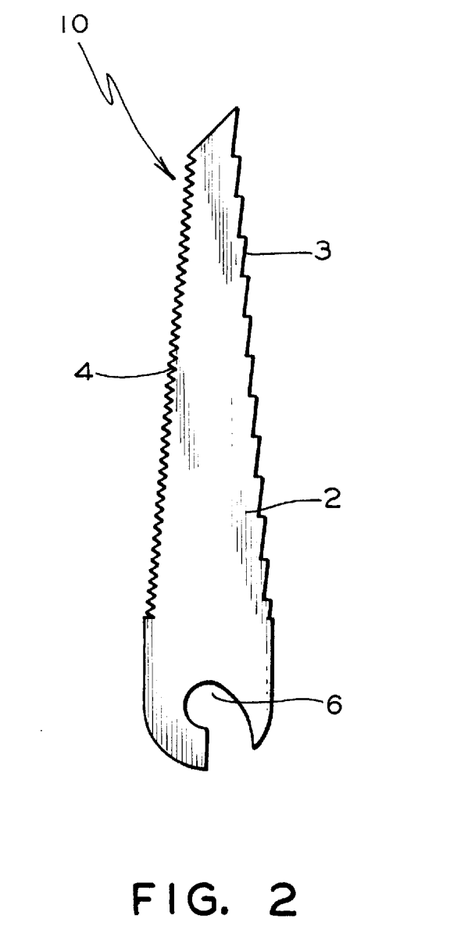
FIG. 2 is a top view of a multipurpose blade member according to an alternate embodiment of the invention.

Illustrated in FIGS. 1 and 2 is a multipurpose saw blade member, generally designated 10, for use in a utility tool, not shown. Such multipurpose saw blade member consists of an elongated metallic strip portion 2 which has a predetermined thickness and a predetermined composition. Such elongated metallic strip portion 2 has a first end with a first predetermined width and a second end having a second predetermined width. Elongated metallic strip portion 2 further has a first elongated edge 3 having a first serrated surface, such first elongated edge 3 is disposed between such first and such second ends. There is a second elongated edge 4 having a second serrated surface on such elongated metallic strip portion 2. Such second elongated edge 4 is also disposed between such first and such second ends and is radially opposed to such first elongated edge 3.

In a first embodiment of the invention it is presently preferred that the sawtooth serrations of such first elongated edge 3 are different than the sawtooth serrations of second elongated edge 4. Thus, it is presently preferred that one of the elongated edges have sawteeth that are designed to cut through metallic surfaces, such as nails or any other metals that might be present in a wall, while the other elongated edge has sawteeth serrations that are designed for cutting through nonmetallic surfaces such as wallboard, plaster, wood, plastic or other such building materials. In this manner a worker can operate with one saw blade regardless of the surface he has to cut. Such multipurpose saw blade member 10 can be adapted to be used in a variety of utility tools or saws which incorporate replaceable blades.

Such saw blade member further includes a means 6 that is disposed closely adjacent such second end of such elongated metallic strip portion 2 that is engageable with a handle portion of a utility tool or saw. Such means 6 may be a circular aperture in which case the multipurpose blade 10 would simply slip over an attaching member of a utility tool, or such aperture may entail a circular aperture with a cut out portion so such multipurpose blade 10 would simply slide into and lock in on attaching member of a utility tool. Further it is preferred that the predetermined width of the second end of elongated metallic strip 2 be greater than the predetermined width of the first end.

Reference is now made to FIGS. 3 through 7. Illustrated therein is a retractable saw device, generally designated 20, according to a second aspect of the invention. Such retractable saw device 20 includes a handle member, generally designated 30 and a saw blade member 10. Such saw blade member 10 has been described in detail supra. Such handle member 30 has a predetermined configuration.

Figures 3, 4, 5:
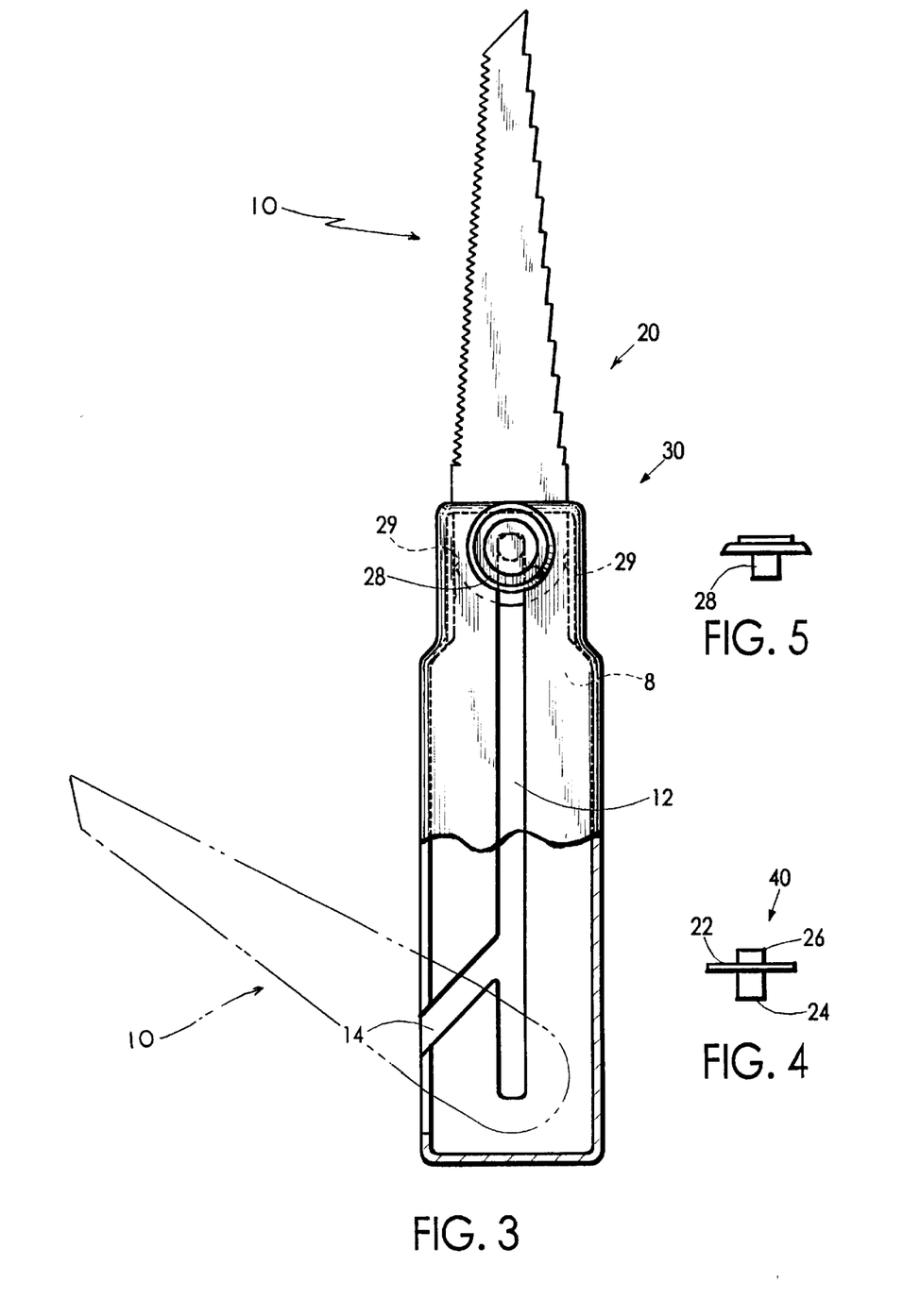
FIG. 3 is a partial cross-section view of a first side of a retractable saw device according to second aspect of the invention.
FIG. 4 is a side view of the platform assembly of the second aspect of the invention.
FIG. 5 is a side view of a lock and unlock cap that engages the top portion of the platform assembly of FIG. 4.

Retractable saw device 20 further includes a means that is engageable with saw blade member 10 for slidably moving such saw blade 10 from a retracted position within the handle 30 to an operable position extended out of handle 30. Such means also permits the saw blade 10 to pivotably rotate when it is in a retracted position. Such means is at least partially disposed within such handle member 30.

Such means for slidably moving or pivotably rotating such saw blade 10 includes a cavity 8 in handle member 30. There is an aperture formed in a first side of handle 30 which opens into cavity 8. Such aperture extends substantially from a point closely adjacent a first end of handle 30 to a point closely adjacent the second end of handle 30. At an inner portion of cavity 8 is a slide groove 12 which also extends from a point closely adjacent a first end of handle member 30 to a point closely adjacent a second end of handle member 30. Such slide groove 12 is substantially parallel to and substantially the same length as such aperture that is formed in such first side of handle 30.

Such means further includes a slide lock assembly, generally designated 40. Such slide lock assembly 40 includes a center portion 22 having a predetermined configuration. It is presently preferred that such predetermined configuration is generally disc shaped. It also includes a slide groove lug 24 which projects downward from center portion 22. Slide groove lug 24 engages slide groove 12 of handle 30. Such slide lock assembly 40 also includes a blade lug 26 which engages such aperture 6 of saw blade member 10.

Such slide lock assembly 40 further includes a lock and unlock cap 28. Such lock and unlock cap 28 engages blade lug 26 and when turned locks the slide lock assembly in position. When lock and unlock cap 28 is released, or rotated counterclockwise, the slide lock assembly 40, with saw blade 10 attached, is free to slide along slide groove 12 and move the saw blade 10 to an operable position or to retract the saw blade 10. Again when lock and unlock cap 28 is engaged such slide lock assembly 40 is locked in place.

Such handle member 30 has a slot 17 in a first end of such handle 30. This slot 17 opens into cavity 8 and has a thickness that is slightly greater than the predetermined thickness of saw blade member 10. The width of slot 17 is slightly wider than the largest width of such first or second predetermined widths of such saw blade 10. Slot 17 provides the opening by which saw blade 10 can extend out of handle member 30 to an operable position.

Figure 6:
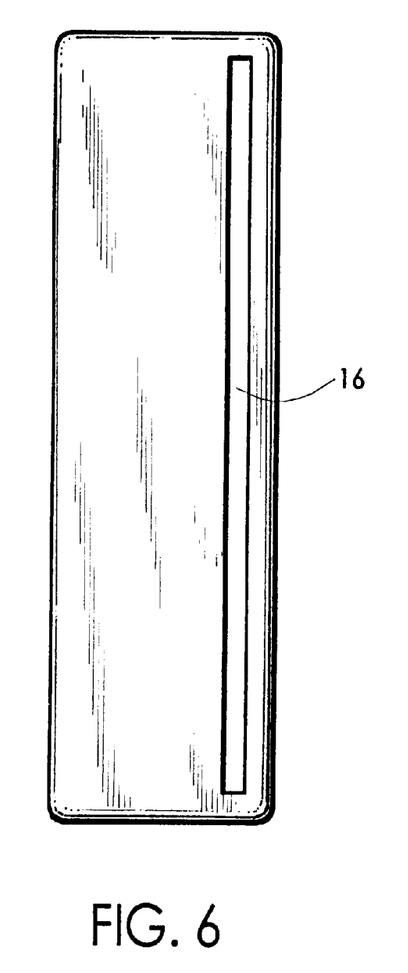
FIG. 6 is a side view of a retractable saw device showing a slot in the side for an alternate embodiment of the invention.

Such handle member 30 further includes a slot 16 in a second side of handle member 30, as can be seen in FIG. 6. Slot 16 opens into cavity 8 and extends from a point closely adjacent a first end of handle member 30 to a point closely adjacent a second end. Such slot 16 has a thickness slightly greater than the predetermined thickness of saw blade member 10. When the saw blade 10 is in a retracted position it is possible for the saw blade 10 to pivot on slide lock assembly 40 and thus extend out of slot 16 so that the saw blade 10 is at a right angle to the handle 30. It can lock in this position and be used as a right angle saw.

Handle member 30 further includes a swift change slide groove 14 which is a side branch of slide groove 12 and opens onto slot 16. Such swift change slide groove 14 enables such slide lock assembly 40 with saw blade 10 attached to slide to the side of handle 30 and permits a quick blade replacement with a minimum of difficulty by releasing lock and unlock cap 28.

Handle 30 may also include a blade guide 29 disposed in cavity 8 closely adjacent such first end of handle 30. Blade guide 29, as the name implies, insures that saw blade 10 moves precisely through cavity 8 in handle 30 and out such first slot 17 without any side movement.

Although the configuration of handle member 30 is not limited and may have various shapes, in the presently preferred embodiment of the invention it is preferred that the configuration is generally rectangular. Although it is described and presently preferred that the shape of the handle is generally rectangular this does not limit it in such a way that the edges might not be rounded so as to provide a handle that is easier for a worker to hold and operate.

Figure 7:
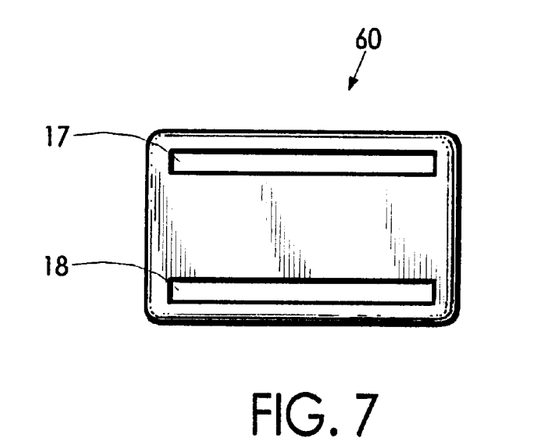
FIG. 7 is a view of a first end of a combination utility saw and knife device.
Figure 8:
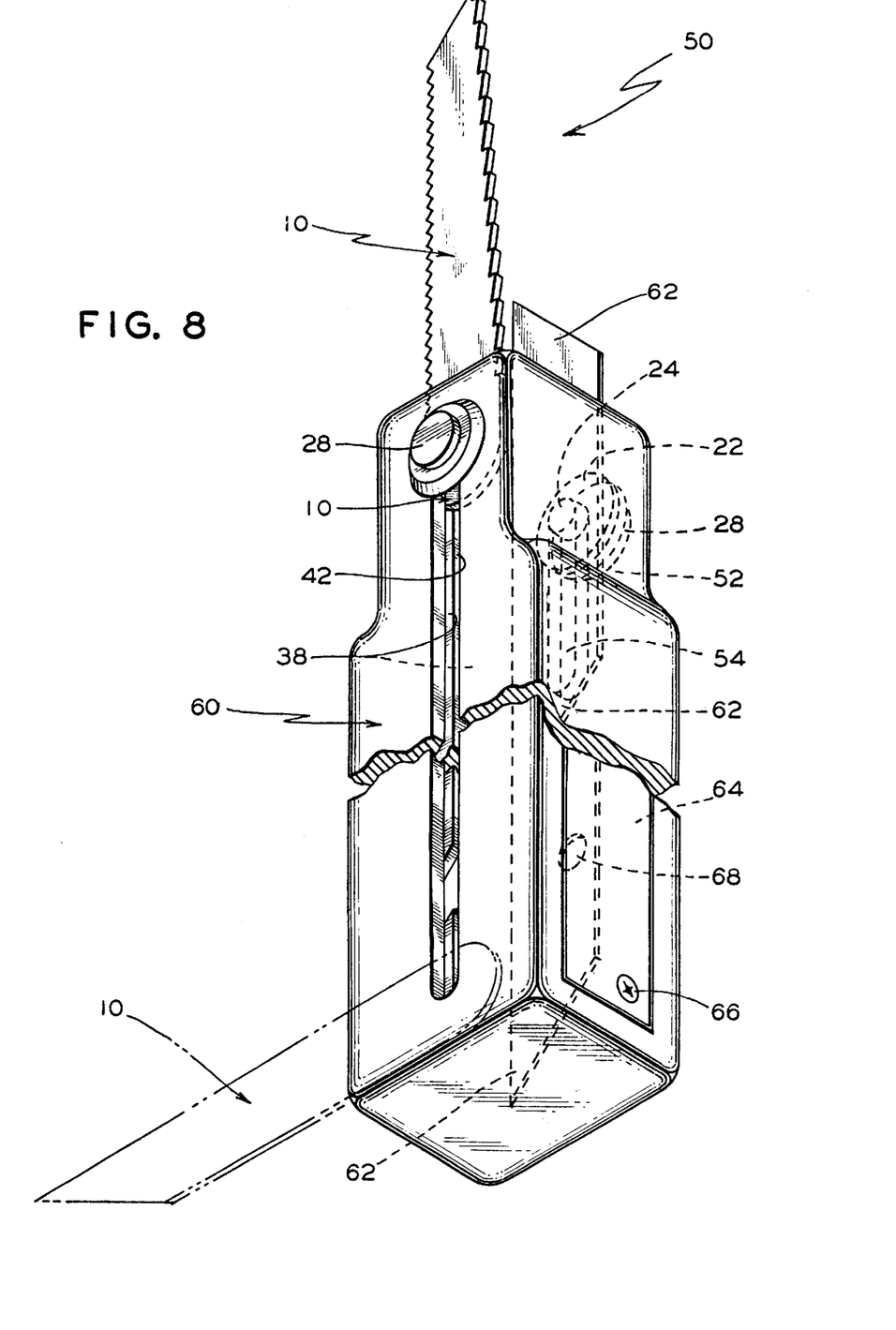
FIG. 8 is a exploded axonometric view of a combination utility saw and knife device according to a third aspect of the invention.
Figure 9:
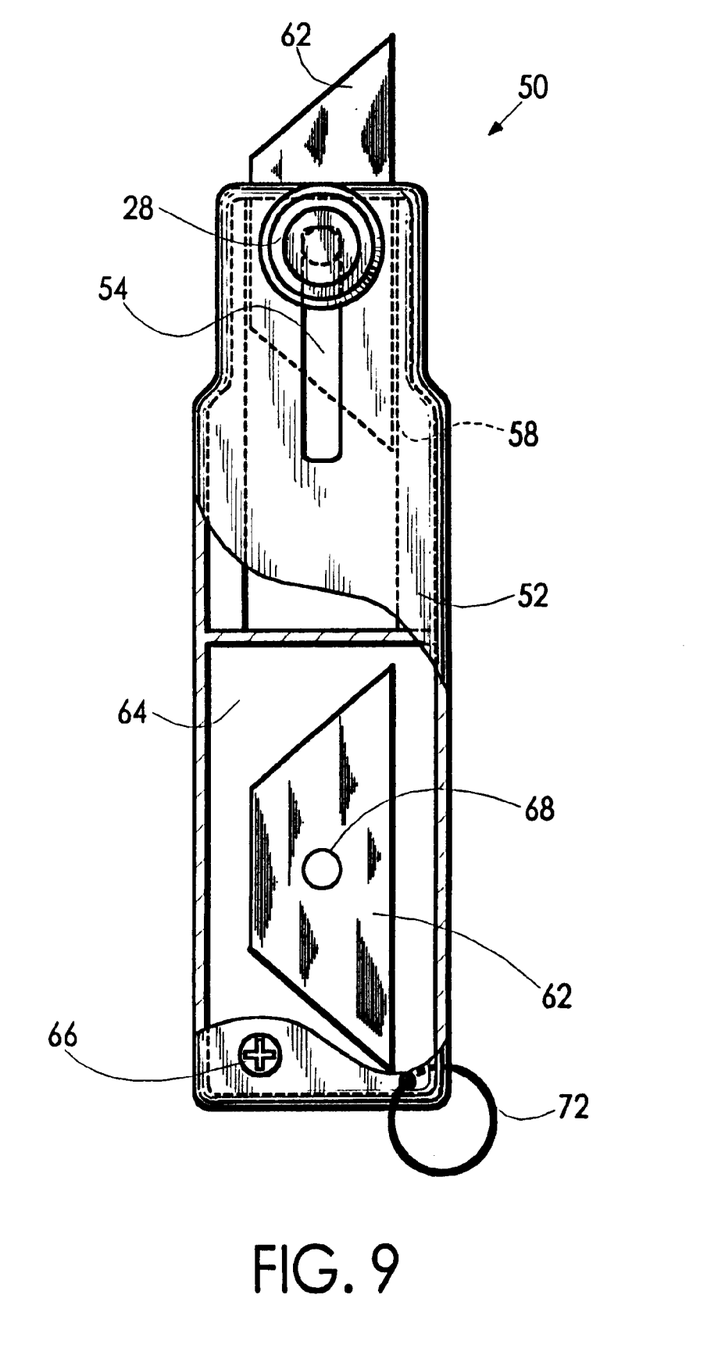
FIG. 9 is a partial cross-section view of a third side of a combination utility saw and knife device according to a third aspect of the invention.

Reference is now made to FIGS. 7, 8 and 9. Illustrated therein is a combination utility retractable saw and knife device, generally designated 50, according to a third aspect of the invention. Such combination utility retractable saw and knife device 50 incorporates many of the features that were described above in the embodiments of saw blade 10 and retractable saw device 20.

FIG. 8 is a partial perspective drawing showing the various aspects of the present invention. Such combination utility retractable saw and knife device 50 comprises a handle member 60. Such handle member 60 is very similar to handle member 30 as described previously in the description of the retractable saw device 20 and includes all of the features described previously. The major difference in such handle member 60 in this aspect of the invention is primarily the inclusion of some additional features related to the inclusion of a utility knife in the same handle.

Such combination utility retractable saw and knife device 50 includes a saw blade member 10. Such saw blade member 10 is similar to that described previously and won't be described again. Such saw blade member is disposed at least one of within such handle member 60 or attached to an exterior portion of such handle member 60. It is presently preferred that the saw blade member 10 is disposed within such handle member 60, at least when the blade is in a retracted position, and not in the alternative attached position. In the alternative attached position such exterior portion of the handle has an enclosure which at least encloses the saw blade member so that the saw teeth are not exposed when the blade is retracted.

Handle member 60 includes a first cavity 38 which is similar to cavity 8, described previously. There is an aperture formed in a first side of handle 60 which opens to cavity 38. Such aperture extends substantially from a point closely adjacent a first end of handle 60 to a point closely adjacent the second end of handle 60. At an inner portion of first cavity 38 is a saw blade slide groove 42 which extends from a point closely adjacent a first end of handle member 60 to a point closely adjacent a second end of handle member 60. Such slide groove 42 is substantially parallel to and substantially the same length as such aperture that is formed in such first side of handle 60.

Handle member 60 further includes a slot 17 at such first end of such handle member 60 The first end of handle member 60 differs from the first end of handle member 30, as described previously, in that in addition to slot 17, a second slot 18, substantially parallel to slot 17, is also present on such first end of handle member 60.

Such means for slidably moving such saw blade 10 in handle member 60 further includes a slide lock assembly, generally designated 40. Such slide lock assembly 40 includes a center portion 22 which has a predetermined configuration. It is presently preferred that such predetermined configuration be generally disc shaped. It also includes a slide groove lug 24 which projects downward from center portion 22. Such slide groove lug 24 engages slide groove 42 of handle 60. Such slide lock assembly 40 also includes a blade lug 26 which engages such aperture 6 of saw blade member 10.

Such slide lock assembly 40 also includes a lock and unlock cap 28. Such lock and unlock cap 28 engages blade lug 26 and when turned in locks the slide lock assembly with saw blade 10 attached in position. When lock and unlock cap 28 is released or twisted counter clockwise the slide lock assembly 40 with saw blade 10 attached is free to slide along slide groove 42 to move the saw blade 10 through such slot 17 in the first end of handle 60 to an operable position or to retract the saw blade 10 within handle member 60. Again when lock and unlock cap 28 is engaged such slide lock assembly 40 is locked in place.

Such handle member 60 further includes a slot 16 in a second side of handle member 60. Such slot 16 is the same as that described previously for handle 30 as can be seen in FIG. 6. Slot 16 opens into first cavity 38 and extends from a point closely adjacent a first end of handle member 60 to a point closely adjacent a second end. Such slot 16 has a thickness slightly greater than the predetermined thickness of saw blade member 10. When the saw blade 10 is in a retracted position it is possible for the saw blade 10 to pivot on slide lock assembly 40 and thus extend out of slot 16 so that the blade is at a right angle to the handle 30. When lock and unlock cap 28 is turned it locks the blade in this position and thus can be used as a right angle saw.

Such handle member 60 may also include a blade guide in first cavity 38. Such blade guide is virtually identical to blade guide 29 disposed in cavity 8 as described previously and shown in FIG. 3. Such blade guide is closely adjacent such first end of handle 60. Blade guide 29, as the name implies, insures that saw blade 10 moves precisely through cavity 38 in handle 60 and out such first slot 17 without any side movement.

In the alternative attached position such exterior portion of the handle with an enclosure which at least encloses the saw blade member when the blade is retracted also includes means for connecting such saw blade to such exterior portion and means for slidably moving or pivotably rotating such saw blade to an operable position and a means for locking the saw blade in operable and retracted positions.

The present invention of a combination utility retractable saw and knife device 50 further includes a knife blade member 62. Such knife blade member 62 is a conventional utility knife blade that is available in prior art. Such handle member 60 of this aspect of the invention includes a second cavity 52. Such second cavity 52 is disposed on the opposite side of such handle member 60 as is central cavity 38. There is an aperture in such third or opposite side handle member 60 which opens into second cavity 52. Whereas first cavity 38 opens in an aperture on such first side of handle member 60, such second cavity opens in an aperture on such third or opposite side of such handle member 60. Such second cavity 52 extends from a point closely adjacent such first end of handle member 60 to a point substantially at a midpoint between such first end and such second end of handle member 60. The aperture in such third side of handle member 60 only extends about one fourth of the distance between such first end and such second end of handle member 60. The distance of the aperture is the distance required to extend such knife blade 62 from a retracted position in handle member 60 where the knife blade 62 is completely enclosed in the handle to an operable position where a sufficient portion of the knife blade 62 is exposed to permit its use as a knife.

At an inner portion of second cavity 52 is knife blade slide groove 54. Such knife blade slide groove 54 is substantially parallel to and substantially the same length as such aperture in such third side of handle 60.

Such means for slidably moving such knife blade 52 in handle member 60 further includes a slide lock assembly, generally designated 40. Such slide lock assembly 40 includes a center portion 22 having a predetermined configuration. Again it is presently preferred that such predetermined configuration is substantially disc shaped. Slide lock assembly 40 also includes a slide groove lug 24 which projects downward from such center portion 22. Slide groove lug 24 engages knife blade slide groove 54 of handle 60. Such slide lock assembly 40 also includes a blade lug 26 which engages such aperture 68 of the knife blade member 62.

Such slide lock assembly 40 also includes a lock and unlock cap 28. Such lock and unlock cap 28 engages blade lug 26 and when turned locks the slide lock assembly 40 with knife blade 62 attached in position. When lock and unlock cap 28 is released the slide lock assembly 40 with knife blade 62 attached is free to slide along slide groove 54 to move the knife blade 62 through such slot 18 in the first end of handle 60 to an operable position or to retract the knife blade 62 to a position where it is enclosed within handle member 60. Again when lock and unlock cap 28 is engaged such slide lock assembly 40 is locked in place.

Handle member 60 may further include a third cavity 64. Such third cavity 64 is similar to second cavity 52 being also disposed in such third side of handle 60 except that such third cavity 64 does not open into an aperture in the third side as does second cavity 52. Third cavity 64 is a compartment for the storage of a replacement knife blade 62. Enclosing such third cavity 64 is a movable section of handle member 60, such movable section is held in place with handle screw 66.

Handle 60 may further include a blade guide 58 disposed in second cavity 52 and is closely adjacent such first end of handle member 60. Blade guide 58, as the name implies, insures that knife blade 62 moves precisely through cavity 52 in handle 60 and out such slot 18 in such first end without any side movement.

Such handle 60 may also include a snap ring 72 connected to such second end of handle member 60 whereby such combination tool may be connected to a workers belt or other equipment to make the combination tool easily accessible.

Again it is presently preferred that such handle 60 have a shape that is generally rectangular. Even though the drawings show the handle to be rectangular and it is preferred that the handle be generally rectangular, this does not in any way limit it. The edges of such handle may be rounded so as to provide a easier grip for a worker to use.

Thus, the present invention of a combination utility retractable saw and knife device provides a tool for a worker whereby he can saw through virtually any type of material encountered in electrical work such as installing or replacing electrical fixtures, or in other similar types of work. The same tool provides a utility knife blade for other type of cutting applications.

Figure 10:
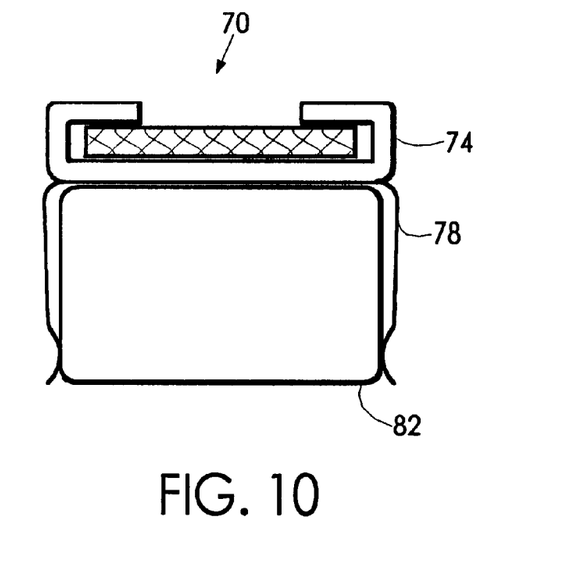
FIG. 10 is cross section view of a fourth embodiment of the invention.
Figure 11:
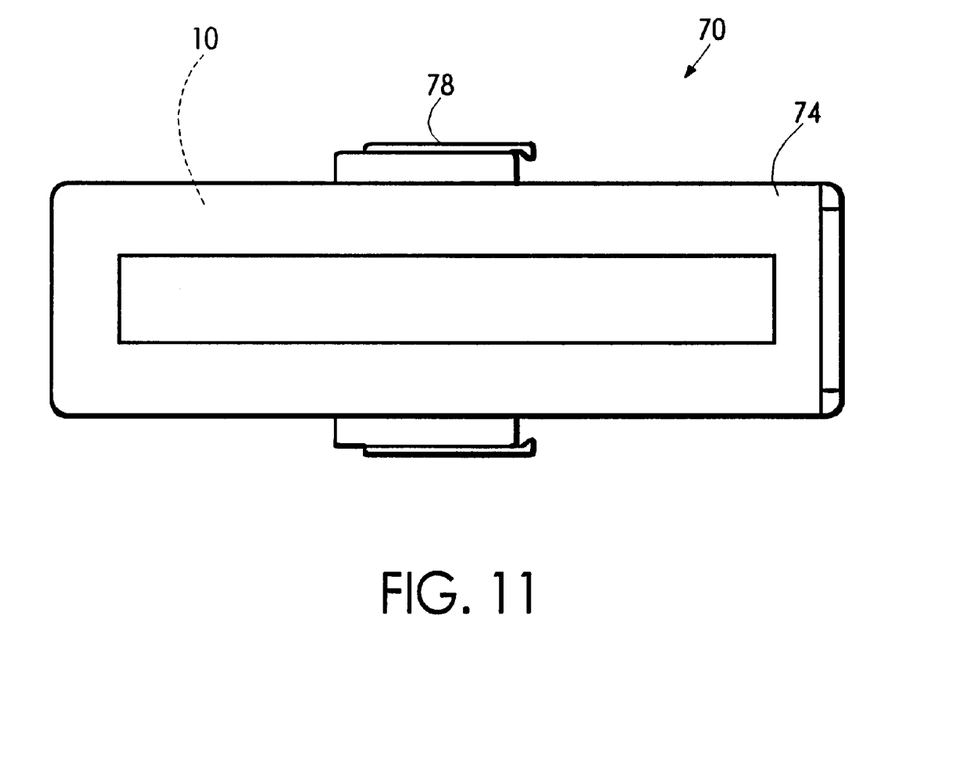
FIG. 11 is a partial cross section view of a first side of a fourth embodiment of the invention.

Reference is now made to FIGS. 10 and 11. Illustrated therein is a fourth embodiment of the invention. In this embodiment there is an attachment, generally designated 70, that is used in combination with a utility knife 82. Such attachment includes a housing 74. A saw blade 10 is disposed within such housing 74. Attachment 70 further includes a means for securing such attachment to utility knife 82. In a presently preferred embodiment such means is a spring clip 78 which snaps on to the handle of a utility knife 82 and thus provides a worker with a saw blade and a knife blade in the same tool. Such attachment also includes a means for moving such saw blade to an operable position and means for locking such saw blade in operable or retracted positions.

While a presently preferred and a number of alternative embodiments of a double edged saw blade and a combination retractable saw and knife device according to the present invention have been described in detail above, it should be understood that a number of other adaptations and modifications of such improved tool can be made by persons who are skilled in the relative art without departing from either the spirit of the invention or the scope of the appended claims.

We claim:

1. A retractable saw device, said retractable saw device comprising:
   (a) a handle member having a predetermined configuration, said handle member having a cavity formed therein;
   (b) a saw blade member formed from an elongated metallic strip, said saw blade member disposed within said cavity in said handle member when in a retracted position, said elongated metallic strip portion having:
      (i) a predetermined thickness and a predetermined composition,
      (ii) a first end having a first predetermined width,
      (iii) a second end having a second predetermined width,
      (iv) a first elongated edge disposed between said first end and said second end, and
      (v) a second elongated edge disposed between said first end and said second end, at least one of said first elongated edge and said second elongated edge having a serrated surface;
   (c) a means engageable with said saw blade member for connecting said saw blade member with said handle member of said retractable saw device;
   (d) a means engageable with said saw blade member for at least one of slidably moving and pivotably rotating said saw blade member to an operable position, said means for at least one of slidably moving and pivotably rotating said saw blade member being at least partially disposed within said handle member;
   (e) a means engageable with said saw blade member and said handle member for locking said saw blade member in said operable position and in said retracted position, said means for locking said saw blade member being at least partially disposed within said handle member; and
   (f) a first slot disposed in a second side of said handle member for permitting said saw blade member to pivotably rotate and extend outward in said operable position, said operable position being substantially at a right angle with said handle member, said first slot opening to said cavity.

2. A retractable saw device, according to claim 1, wherein said first elongated edge has a first serrated surface and said second elongated edge has a second serrated surface.

3. A retractable saw device, according to claim 2, wherein said second serrated surface is different from said first serrated surface.

4. A retractable saw device, according to claim 1, wherein said predetermined configuration of said handle member is generally rectangular.

5. A retractable saw device, according to claim 1, wherein said means engageable with said saw blade member is one of slidably moving and pivotably rotating said saw blade member is one of slidably moving.

6. A retractable saw device, according to claim 5, wherein said means engageable with said saw blade member for slidably moving said saw blade member further includes a second slot in a first end of said handle member, said second slot opens to said cavity.

7. A retractable saw device, according to claim 6, wherein said cavity further includes a saw blade slide groove.

8. A retractable saw device, according to claim 7, wherein said means engageable with said saw blade member and said handle member for slidably moving said saw blade member further includes a slide lock assembly.

9. A retractable saw device, according to claim 8, wherein said slide lock assembly includes a center portion having a predetermined configuration, a slide groove lug projecting downwardly from substantially a midpoint of said center portion for engaging said saw blade slide groove in said cavity and a blade lug projecting outwardly from substantially a midpoint of said center portion for engaging said saw blade.

10. A retractable saw device, according to claim 9, wherein said predetermined configuration of said center portion is substantially disc shaped.

11. A retractable saw device, according to claim 9, wherein said means engageable with said saw blade member and said handle member for locking said saw blade member in said operable position and in said retracted position includes a lock and unlock cap engageable with said slide lock assembly.

12. A retractable saw device, according to claim 1, wherein said means engageable with said saw blade member for connecting said saw blade member to said handle member includes an aperture in said saw blade closely adjacent said second end.

13. A retractable saw device, according to claim 1, wherein each of said at least one of said first elongated edge and said second elongated edge having a serrated surface.

14. A retractable saw device, according to claim 13, wherein serrations of said serrated surface of said at least one of said first elongated edge and said second elongated edge of said elongated strip portion are for cutting metal surfaces.

15. A retractable saw device, according to claim 14, wherein serrations of said serrated surface of a radially opposed surface of said at least one of said first elongated edge and said second elongated edge of said elongated strip portion for cutting metal surfaces are for cutting nonmetallic surfaces.

* * * * *